United States Patent
Keiler et al.

[15] 3,665,293
[45] May 23, 1972

[54] PHASE-CONTROLLED STATIC SWITCH FOR A POWER CIRCUIT HAVING A VARIABLE POWER FACTOR

[72] Inventors: Yoel Keiler, Philadelphia; Fred W. Kelley, Jr., Media, both of Pa.; Georges R. E. Lezan, Cherry Hill, N.J.

[73] Assignee: General Electric Company

[22] Filed: Mar. 3, 1971

[21] Appl. No.: 120,509

[52] U.S. Cl. ...................................323/24, 307/252 T
[51] Int. Cl. ..........................................G05f 1/56
[58] Field of Search ..............307/252 T; 323/22 SC, 24

[56] References Cited

UNITED STATES PATENTS

| | | | |
|---|---|---|---|
| 3,375,437 | 3/1968 | Mellott et al. | 323/22 SC |
| 3,541,421 | 11/1970 | Buchman | 323/24 |
| 3,558,982 | 1/1971 | Greenwood | 323/24 |

*Primary Examiner*—A. D. Pellinen
*Attorney*—J. Wesley Haubner, William Freedman, Frank L. Neuhauser, Oscar B. Waddell and Joseph B. Forman

[57] ABSTRACT

A gating control for an a-c phase-controlled, single-phase static switch comprising a pair of thyristors connected in inverse parallel relationship in a power circuit that has a variable power factor. The gating control controls the length of the non-conducting period between successive conduction periods of the switch in such a manner that the length of the non-conducting period is made approximately inversely proportional to an input control signal for the gating control, when the input control signal is between 0 and 1 per unit. A conduction-angle balancing circuit modifies the action of the gating control in such a manner that the conduction angles are forced toward a condition of equality despite a change therein produced by a change in the effective input control signal and despite the power circuit's having a low power factor.

14 Claims, 4 Drawing Figures

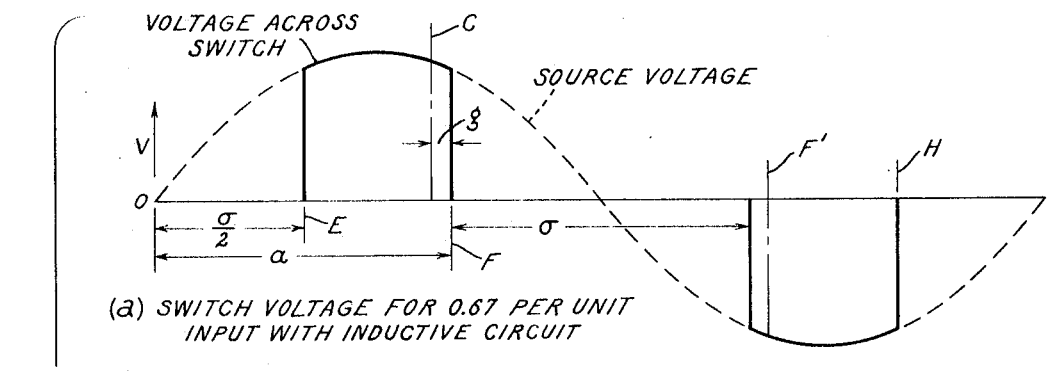
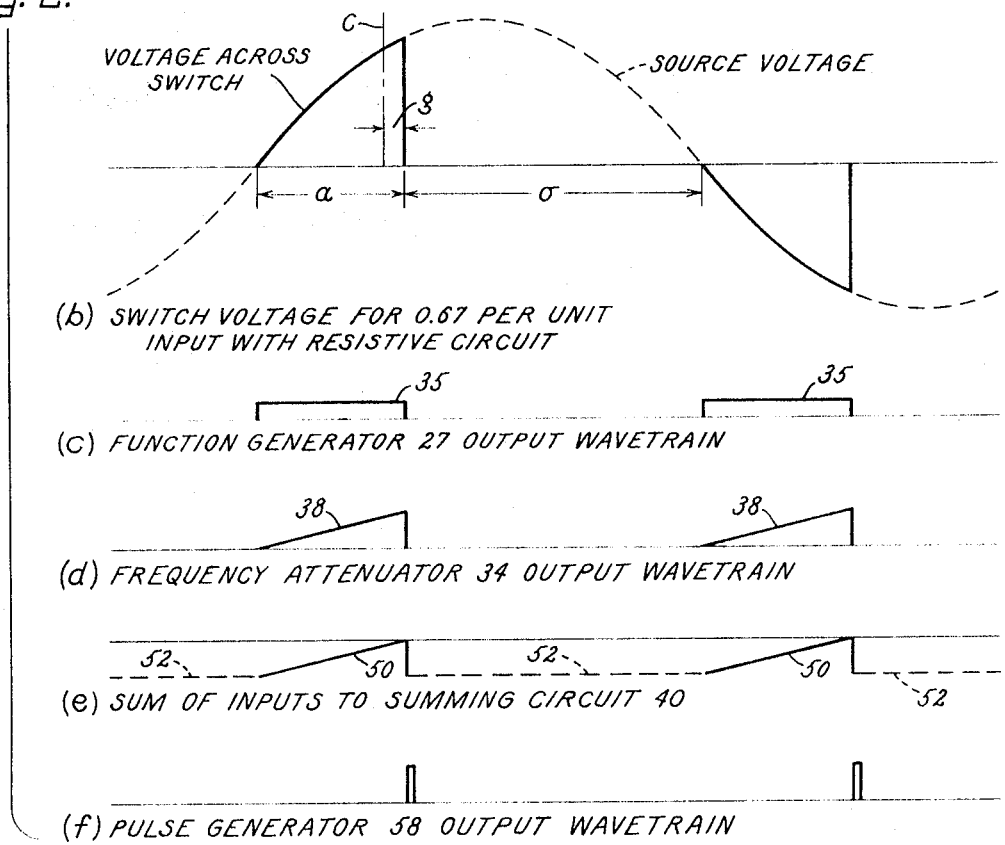
Fig. 2.
(a) SWITCH VOLTAGE FOR 0.67 PER UNIT INPUT WITH INDUCTIVE CIRCUIT
(b) SWITCH VOLTAGE FOR 0.67 PER UNIT INPUT WITH RESISTIVE CIRCUIT
(c) FUNCTION GENERATOR 27 OUTPUT WAVETRAIN
(d) FREQUENCY ATTENUATOR 34 OUTPUT WAVETRAIN
(e) SUM OF INPUTS TO SUMMING CIRCUIT 40
(f) PULSE GENERATOR 58 OUTPUT WAVETRAIN
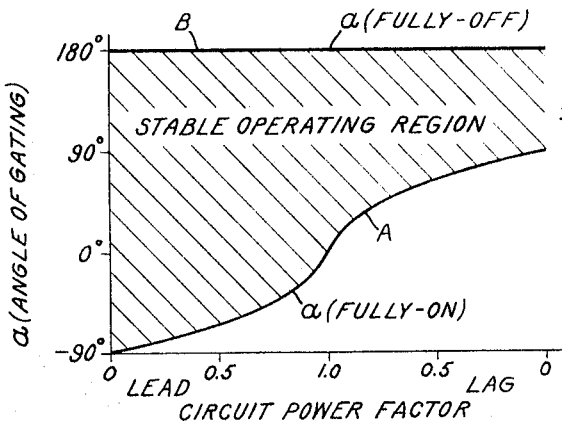
Fig. 3.

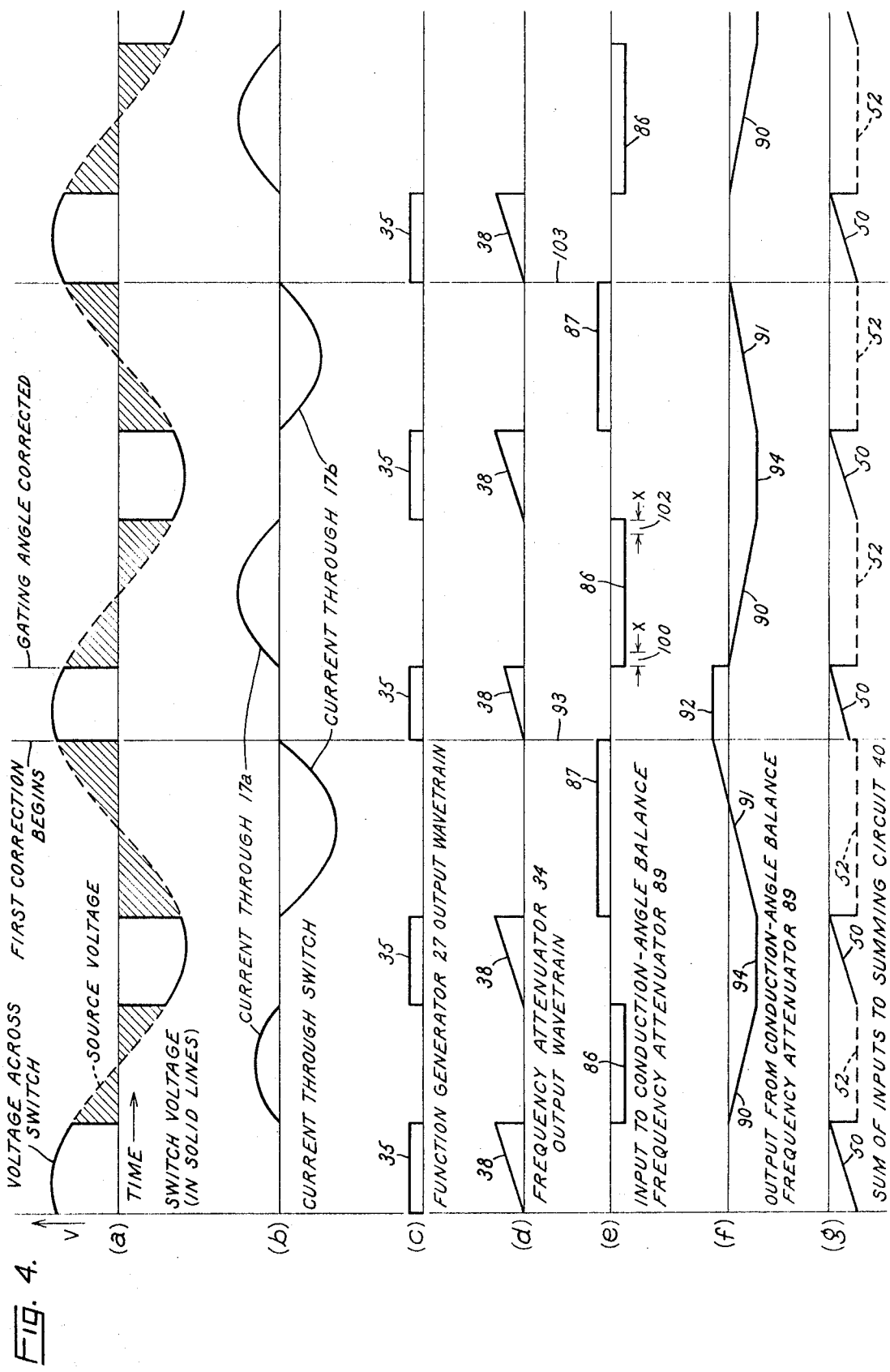

3,665,293

PHASE-CONTROLLED STATIC SWITCH FOR A POWER CIRCUIT HAVING A VARIABLE POWER FACTOR

BACKGROUND

This invention relates to an a-c static switch comprising a pair of thyristors connected in inverse parallel relationship in a power circuit and, more particularly, relates to gating control means for controlling the phase angle of the a-c wave at which each thyristor is triggered into conduction. This phase angle, as measured from the start of forward voltage of the source of the power circuit, is referred to hereinafter as the gating angle.

A static switch is open when all of its constituent thyristors are turned off, and it is closed when the thyristors are turned on and conducting. In an a-c switch, the inversely poled thyristors conduct alternately, and they are cyclically triggered into conduction in synchronism with the source voltage. The moment of triggering is conveniently expressed as an electrical angle referenced to zero crossings of the source voltage, which angle is referred to hereinafter as the gating angle. The time during which the thyristor conducts following triggering is referred to hereinafter as the conduction angle. When this conduction angle is substantially 180° for each thyristor, the switch is considered to be fully-on; and when substantially 0° is considered to be fully-off.

Source voltage is applied to the load in the power circuit only during the conducting intervals of the switch, and therefore the average or mean value of load voltage will depend on when the thyristors are triggered and how long they conduct each cycle. In conventional a-c phase-controlled switches, the load voltage is varied between maximum and zero by appropriately varying (retarding or advancing) the gating angle.

SUMMARY

For controlling the conduction angle of the thyristors, an input signal is supplied to the gating control of the switch, and the gating control responds to this input signal by adjusting the conduction angle of the switch to a value dependent upon the magnitude of the input signal. For a positive input signal of 1 per unit or greater, a conduction angle of substantially 180° (i.e., a fully-on condition) is desired. For an input signal of 0 or of a negative value, a substantially 0 conduction angle (i.e., a fully-off condition) is desired. For a positive input signal between 0 and 1 per unit, a conduction angle approximately proportional to the input signal is desired.

The approximately proportional relationship of conduction angle to input signal is not difficult to obtain if the switch is used in a power circuit that is predominantly resistive, i.e., with a power factor of substantially unity. In a switch used in such a circuit, the conduction angle has a substantially fixed relationship with respect to the gating angle, and the gating angle can be made inversely proportional to the magnitude of the input signal to achieve the desired control of the conduction angle. But in many circuits where it is desired to use this type switch, the power factor can be widely different from unity and in some such circuits, the power factor can be widely variable. In these latter type circuits, it is not sufficient merely to make the gating angle inversely proportional to the input signal.

An object of our invention is to provide a gating control which, despite wide variations in the power factor of the power circuit, is capable of maintaining an approximately proportional relationship between the conduction angle and the input signal for values of input signal varying between 0 and 1 per unit.

Another object is to provide a gating control which, though capable of producing the approximately proportional relationship of the preceding paragraph, is effectively prevented from producing conduction angles exceeding 180° despite input signals greater than 1 per unit. This is an undesirable condition for a number of reasons, one of which is that the current flowing through the power circuit under such conditions will have an undesirable d-c component that can produce saturation and overheating effects.

A more general object is to provide, for a static switch, a gating control that produces substantially the same conduction angle of the switch for a given input signal despite wide variations in the power factor of the power circuit.

In one form of our invention, we measure the non-conducting periods between successive conduction periods and make these nonconducting periods approximately inversely proportional in length to the input signal for input signals between 0 and 1 per unit. In applying this approach to switches that are used in power circuits that have a low power factor, such as predominantly inductive circuits, a difficulty is encountered. More specifically, a change in input signal tends to force the switch characteristics into an undesirable asymmetrical conducting condition in which the conduction periods for one thyristor are unequal to those of the oppositely conducting thyristor. Unless this tendency is counteracted, the more the input signal is changed, the more pronounced becomes the asymmetrical conducting condition.

Another object of our invention is to provide a gating control, which though operating on the principle of making the nonconducting period approximately inversely proportional to the input signal, can function without causing the aforesaid asymmetrical conducting condition to develop even in an inductive power circuit application.

In carrying out our invention in one form, we provide a gating control that measures the nonconducting period between successive conduction periods and develops an off-time indicating signal that is representative of the length of said nonconducting period. This indicating signal is compared with an effective input control signal, and from this comparison a gating control signal is derived which controls the length of the nonconducting period in such a manner as to make this nonconducting period approximately inversely proportional in length to the input control signal, when the input control signal is between 0 and 1 per unit. The gating control further includes a conduction-angle balancing circuit which develops a balance-indicating signal that has a magnitude proportional to the difference between the conduction angles of the two oppositely-conducting thyristors. Means sensitive to this balance-indicating signal modifies the gating control signal in such a manner that said conduction angles are forced toward a condition of equality despite a change therein produced by a change in the effective input control signal and despite the power circuit's having a low power factor.

BRIEF DESCRIPTION OF DRAWINGS

For a better understanding of the invention, reference may be had to the following description taken in conjunction with the accompanying drawings, wherein:

FIG. 2 is a graphic representation of certain electrical relationships that are present in the gating control of FIG. 1.

FIG. 3 is a graphic representation of the gating angles that will produce stable operation of a static switch for different circuit power factors.

FIG. 4 is another graphic representation of certain electrical relationships that are present in the gating control of FIG. 1, with particular emphasis on the conduction-angle balancing feature of the switch.

DETAILED DESCRIPTION OF PREFERRED EMBODIMENT

The Power Circuit Components

Figure 1:
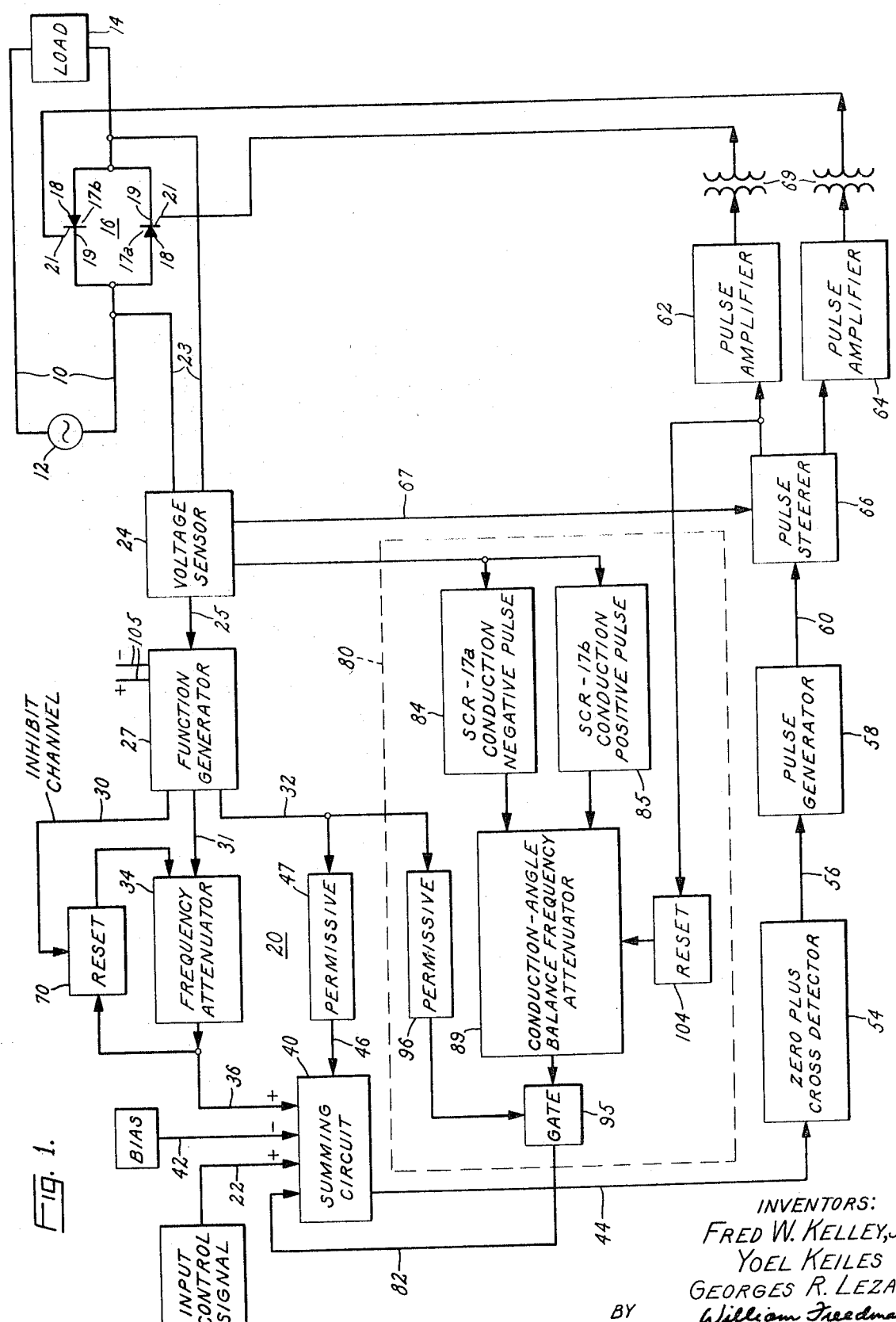
FIG. 1 is a schematic diagram of a static switch with a gating control embodying one form of our invention.

Referring now to FIG. 1, there is shown an a-c power circuit 10 that comprises a source 12 of alternating voltage, a load 14, and a static switch 16. The load 14 and the static switch 16 are connected in series with each other across the terminals of source 12. It will be assumed that the load is one which has a power factor that is subject to wide variations or changes while the power circuit is in operation. An example of such a load is an induction furnace, where the impedance and power factor vary widely as the charge within the furnace is melted. Under certain conditions, the effective load may be almost entirely inductive.

The illustrated static switch 16 comprises a pair of thyristors, in the form of conventional silicon controlled rectifiers (SCRs) 17a and 17b, connected in inverse parallel relationship in the power circuit. Each thyristor has a nonconducting or blocking state in which it presents very high impedance to flow of current and a conducting or turned-on state in which it freely conducts forward current with only a relatively slight voltage drop. It can be switched abruptly from the blocking state to the turned-on state by the concurrence of a forward bias on its main electrodes (anode 18 at a positive potential with respect to cathode 19) and a trigger signal on its gate 21. The time at which the thyristor is turned on, measured in electrical degrees from the cyclically recurring instant at which the source voltage becomes positive is referred to as the "gating angle."

Once turned on, a thyristor 17a or 17b will continue conducting until its "forward current" is subsequently reduced below a given holding level by the action of the external circuit in which the thyristor is connected. This turn-off process is generally referred to as "commutation." The time during which the thyristor is turned on measured in electrical degrees from the instant of turn-on to the instant of commutation is referred to as the "conduction angle."

Although, for simplicity, we have shown only one thyristor in each conducting branch of the switch circuit, it is to be understood that for higher current switches, additional thyristors can be connected in parallel with each thyristor, and for higher voltage switches, additional thyristors can be connected in series with each thyristor.

Sensing Voltage Across Static Switch 16 and Developing an Off-Time Indicating Signal For controlling the gating angle and hence the conduction angle of each thyristor 17a, 17b, we provide a gating control 20 which responds to a unidirectional input signal received via an input control channel 22 to produce gating of the thyristors at gating angles dependent upon the magnitude of the input signal. Control 20 comprises, first of all, a voltage sensor 24 which senses the instantaneous voltage present across static switch 16 and produces an output at 25 whenever this voltage exceeds a predetermined threshold value. This threshold value is selected to be slightly higher than the maximum voltage drop across the thyristor when in its forward current conducting state. By way of example, in a power circuit having a 600 volt r.m.s. source, each thyristor 17a and 17b might be a commercially available silicon controlled rectifier having a maximum forward drop of 1.5 volts when conducting 100 amperes and less than 4 volts at 5,500 amperes peak surge current. In this example, 5 volts is selected as a practical threshold value at which the detecting means 24 operates to develop its output at 25. It is noted that this threshold value is about 1 percent of the r.m.s. source voltage and is attained by the source voltage in less than 1 electrical degree as it rises from a natural voltage 0. If additional series-connected thyristors are present, this threshold value would be increased accordingly.

The voltage sensor 24 may be of any suitable conventional design but is preferably of the design shown in more detail and claimed in application Ser. No. 836,765-Kelley et al., filed June 26, 1969, and assigned to the assignee of the present invention. The voltage sensor 24 is shown in FIG. 1 with input leads 23 connected across the switch 16. The voltage sensor includes a suitable isolating transformer (not shown in the present application) which electrically insulates the output components of the voltage sensor from its input components.

The output from the voltage sensor 24 is supplied via channel 25 to a conventional function generator 27 which instantaneously responds to this output from the voltage sensor to develop a constant magnitude indicating signal on its output channels 30, 31, and 32. In the graphic representation of FIG. 2, this first indicating signal is shown at 35 in FIG. 2c.

This first indicating signal 35 is supplied via channel 31 to a frequency attenuator 34, preferably in the form of an integrator, which develops on its output channel 36 a second indicating signal that rises progressively so long as the first indicating signal is received via channel 31. This second indicating signal, referred to hereinafter as the "off-time indicating signal," is shown at 38 in FIG. 2d, where it can be seen that it rises substantially linearly so long as the input signal 35 is received.

The off-time indicating signal 38 is supplied via channel 36 to a summing circuit 40 that has four primary input channels 22, 36, 42 and 82 and an output channel 44. Input channel 22 is the channel through which the input control signal is supplied. Input channel 42 is a channel through which a bias signal, soon to be described, is supplied. Input channel 36 is the channel through which the off-time indicating signal 38 is supplied to the summing circuit. Input channel 82 is a channel through which a balance-indicating signal is supplied indicative of the difference in conduction angles of the two thyristors 17a and 17b.

Comparing the Off-Time Indicating Signal with an Effective Input Control Signal The summing circuit 40 is able to add together the signals supplied thereto via input channels 22, 42, 36 and 82, provided it is turned on and maintained turned on by an enabling signal (soon to be described) supplied via a permissive channel 46. Assuming such turn-on, the summing circuit 40 develops on channel 44 an output signal equal to the sum of these input signals at 22, 42, 36 and 82.

For the present, it will be assumed that the conduction angles of the two thyristors are equal and that no signal is therefore being received via channel 82. The off-time indicating signal 38 and the input control signal at 22 are of positive polarity; and the bias signal at 42 is of a negative polarity. The sum of these signals is an output signal such as illustrated at 50 in FIG. 2e. This output signal 50 rises towards 0 from a negative base level 52 determined by the sum of the negative bias signal and the positive input control signal. FIG. 2e depicts this base level in dotted-line form. If there is no input control signal at 22, the output signal 50 will not cross 0 during a 180° rise of the indicating signal 38. But if there is a positive input control signal at 22, the base level 52 will be nearer to 0, and the output signal 50 will accordingly cross the 0 line before the expiration of 180 electrical degrees.

For sensing the instant that the output signal 50 crosses the 0 line, a 0+ crossing detector 54 of conventional form is provided. This crossing detector responds to the 0 crossing by immediately developing an output on channel 56 upon such a 0 crossing. It is understood that a 0 crossing occurs when the input signal rises from a negative value or from 0 to a value slightly exceeding 0. To briefly summarize the operation of summing circuit 40 and the 0+ crossing detector 54, the sum of the positive input control signal at 22 and the negative bias signal at 42 can be thought of as the effective input control signal for the gating control 20. This effective input control signal has a magnitude represented by the dotted horizontal line 52 of FIG. 2e. Summing circuit 40, in effect, compares this effective input control signal with the off-time indicating signal received via channel 36. When this comparison shows the off-time indicating signal exceeding the effective input control signal, the 0+ crossing detector 54 responds by developing its output at 56.

Gating the Appropriate Thyristor in Response to an Output from the 0+ Crossing Detector A pulse generator 58 receives the output at 56 from zero plus crossing detector 54 and immediately develops a pulse on channel 60 in response to receipt of this output. This pulse on channel 60 is supplied to an appropriate one of two pulse amplifiers 62 and 64, which immediately responds by supplying a gating pulse to the gate 21 of the appropriate thyristor 17a or 17b to initiate conduction of switch 16 via the gated thyristor.

For determining which of the two pulse amplifiers will receive the pulse from pulse generator 58, a pulse steerer 66 is provided. This pulse steerer 66 is a conventional bistable switching circuit that in one condition supplies the pulse to amplifier 62 and in its other condition supplies the pulse to amplifier 64. The condition of the switching circuit 66 is determined by the polarity of a control signal received from voltage sensor 24 via a control channel 67. When this control signal is positive, indicating that the voltage across the thyristor 17a is in a forward direction with respect to this particular thyristor, the pulse steerer steers the pulse to the amplifier 62. Conversely, when the control signal on channel 67 is negative, indicating that the voltage across thyristor 17b is in a forward direction relative to this particular thyristor, the pulse steerer steers the pulse to the other amplifier 64. The first amplifier 62 upon receipt of a pulse, supplies an amplified-pulse triggering signal to thyristor 17a, thus turning on this thyristor. The other amplifier 64, upon receipt of a pulse, supplies an amplified-pulse triggering signal to thyristor 17b, thus turning on this thyristor.

Between each of the pulse amplifiers 62 and 64 and its associated thyristor, we provide an isolating transformer 69 for electrically insulating the pulse amplifier from the power circuit 10. These transformers 69 and the isolating transformer in the voltage sensor effectively insulate the gate control 20, including the input control signal channel 22, from the power circuit 10.

Resetting Frequency Attenuator 34

For resetting the frequency attenuator 34 to a zero output condition, a reset circuit 70 is provided. So long as the frequency attenuator has an output, the reset circuit 70 tends to reset the frequency attenuator but is prevented from doing so by an inhibit signal received from the function generator 27 via channel 30. Reset circuit 70 is prevented from functioning so long as it receives this inhibit signal. When the output of function generator 27 terminates, as a result of no voltage being present across the switch 16, the inhibit channel ceases supplying the inhibit signal to reset circuit 70. The reset circuit responds to this condition by resetting the frequency attenuator to a 0 output condition. Such resetting occurs at the end of each forward voltage period across a thyristor irrespective of whether or not gating of the forwardly biased thyristor has occurred during the period forward voltage has appeared thereacross. Such resetting is important in that it permits a fresh comparison to be made at the beginning of each forward voltage period of the effective input control signal and the off-time indicating signal, thus assuring a consistent response to a given input control signal.

Permissive Device 47 for Controlling Summing Circuit 40

The summing circuit 40 is normally turned off, or disabled, and will turn on and continue turned on to perform its intended summing function only while it receives an enabling signal via a permissive channel 46 from a permissive device 47. Permissive device 47 is simply a switch that effectively closes when supplied with the output of function generator 27 via channel 32. So long as this permissive switch 47 is closed, an enabling signal is supplied therethrough via channel 46 to the summing circuit 40. Since the permissive device produces its enabling signal in response to an output from the function generator 27, the enabling signal is supplied only during and in coincidence with the nonconducting period of the static power switch 16. Accordingly during conduction periods of switch 16 (when function generator 27 is producing no output), the permissive device 47 acts to assure that the summing circuit will have an output of 0. Thus, unless the permissive device is turned on, the zero plus crossing detector 54 is receiving zero input.

It is important that the 0+ crossing detector 54 receive no positive input during conduction periods of static switch 16 because otherwise the detector 54 might be unprepared to initiate a new pulse-generating operation at the precise proper instant. For example, assume that the permissive device 47 was absent and that the summing circuit 40 was receiving via channel 22 a continuous input signal greater than one per unit and that this input signal minus the bias at 42 was being supplied as a positive effective input signal to the 0+ crossing detector during the conduction period of the static switch 16. When the static switch reached the end of its conduction period and the summing circuit 40 began receiving a new off-time indicating signal via channel 36, there would be no new 0 crossing under the assumed conditions (because the 0+ crossing detector would already be receiving an input signal greater than 0). Accordingly, the 0+ crossing detector 54 would remain ineffective so long as the input control signal at 22 was greater than one. The permissive device 47 positively prevents the 0+ crossing detector 54 from entering such an ineffective conduction because it assures that the input to crossing detector 54 will be returned to 0 during each conducting interval of static switch 16.

Although we show the permissive device 47 as preventing the summing circuit 20 from developing its output at 44 while the static switch 16 is conducting, it will be apparent that equivalent performance could be obtained if the summing circuit 20 was always allowed to develop its output at 44, and the permissive device 47 was arranged to normally block the 0+ crossing detector 54 from effectively receiving this output until the end of a conducting period of the static switch 16.

General Discussion of Gating Control

Assuming that the input control signal at 22 is between 0 and 1 per unit, the conduction angle $\sigma$ will be directly proportional to the magnitude of the input control signal. This will be explained by referring to FIG. 2e, which depicts at 50 the output of the summing circuit when turned on by permissive device 47. It will be apparent from this figure that the time required for the output signal at 50 to cross the 0 line following turn-on of the summing circuit 40 is directly proportional to the magnitude of the base level 52. This time to crossing is therefore inversely proportional to the magnitude of the input control signal on channel 22. Since this time to crossing corresponds to the non-conducting time of the switch, it will be apparent that the non-conducting time is inversely proportional to the magnitude of the input control signal at 22. Accordingly, the conduction angle $\sigma$ is directly proportional to the magnitude of the input control signal at 22 (assuming that the input control signal is between 0 and 1 per unit).

If the input control signal at 22 is greater than 1 per unit, then as soon as the summing circuit is turned on by the permissive device 47, the output 50 from the summing circuit will jump from its normal 0 value to a positive value. This immediately turns on the 0+ crossing detector 54 to produce immediate gating of the appropriate thyristor 17a or 17b. Irrespective of how much the input control signal at 22 exceeds 1 per unit, the summing circuit 40 cannot develop an output on channel 44 for receipt by the 0+ crossing detector until turned on by the permissive device 47 at the start of the non-conduction period of switch 16. Hence, irrespective of how high the input control signal at 22 is, the 0+ crossing detector 54 will not initiate a gating operation for either thyristor 17a or 17b until the then-conducting thyristor has ceased conducting. If symmetrical current conditions are present, then this relationship of the immediately preceding sentence will prevent the input control signal from producing a conduction angle of greater than 180°, irrespective of how high the input control signal is.

As pointed out hereinabove, the relationship between gating angle and conduction angle varies widely as the power factor of the circuit varies. The curve A of FIG. 3 illustrates the gating angles $\alpha$ that will produce a fully-on condition of the switch for a given circuit power factor. A gating angle α of 180° will produce a fully-off condition, as indicated by the horizontal line B. The gating angle must fall between the two curves A and B in order to produce stable operation of the switch for a given circuit power factor. From this graph of FIG. 3, it can be observed that for purely resistive circuits (with a power factor of 1), stable operation can be obtained for gating angle variations of between 0 and 180°. A gating angle of 0° produces a fully-on condition, and a gating angle of 180° produces a fully-off condition. For a purely inductive circuit (with a lagging power factor of 0), the gating angle limits are 90° for fully-on and 180° for fully-off. For a purely capacitive circuit (with 0 leading power factor), the gating angle limits are −90° for fully-on and 180° for fully-off.

As pointed out hereinabove, an object of our invention is to produce substantially the same conduction angle of the switch for a given input signal despite wide variations in the power factor of the power circuit. FIG 2 illustrates how an input signal of a given magnitude (e.g., 0.67 per unit of input) produces the same conduction angle for both a purely resistive circuit and a purely inductive circuit. The partially dotted-line sine wave of FIG. 2a shows the source voltage for a purely inductive circuit, where gating takes place at a gating angle α measured from passage through 0 of the source voltage. Up to the instant σ/2, the reverse thyristor is conducting, and no substantial voltage appears across the switch 16. At σ/2, the reverse thyristor ceases conducting, and forward voltage immediately appears across the switch. This causes the function generator 27 to develop an output 35 shown in FIG. 2c and the , attenuator 34 to develop the output 38 shown in FIG. 2d. The summing circuit develops an output shown at 50 in FIG. 2e, producing a 0 crossing at α, which causes the pulse generator 58 to immediately trigger the forwardly biased thyristor into conduction. Conduction continues for a conduction angle of σ. In a purely inductive circuit, the conduction period following voltage 0 will equal the conduction period prior to voltage 0, since energy is released from the circuit inductance at the same rate as stored therein in the absence of resistance. Thus, at the instant α+ σ, the switch 16 again becomes non-conducting, and the function generator 27 again turns on, causing another gating pulse to be developed after a non-conducting time interval equal in length to that required for the first gating operation.

The sine wave of FIG. 2b represents the source voltage in a purely resistive power circuit. Gating is shown taking place at a gating angle α that results in a conduction angle σ equal to the conduction angle σ in FIG. 2a. The curves of FIGS. 2a and 2b are horizontally offset so that these equal conduction angles are vertically aligned. In the resistive circuit, when the source voltage crosses 0, voltage across the switch does likewise, causing the function generator 27 to begin its output immediately following the 0 crossing of the source voltage. This results in the frequency attenuator 34 developing an output 38 of the same shape as it did with the purely inductive circuit. Thus, with the resistive power circuit, the same input signal as fed to the summing circuit 40 in the case of the inductive power circuit will result in the output 50 from the summing circuit crossing zero at the same time after the function generator starts its output as with the inductive circuit. Accordingly, for a given input signal at 22, the non-conducting period for the switch 16 will be the same for both the inductive and the resistive power circuits. It can be shown that if the time interval that the switch remains in its nonconducting state between conducting periods is held constant, then the conduction angle will also be held constant irrespective of the circuit power factor, assuming symmetrical current conditions where the thyristors 17a and 17b have equal conduction angles. Accordingly, by holding this nonconducting time interval constant for a given input signal, we obtain the same conduction angle for a given input signal, irrespective of the circuit power factor, again assuming symmetrical current conditions.

The Effect on Current Symmetry of a Change in Input Signal

Referring to the resistive power circuit application of FIG. 2b, assume that the input control signal is increased by an amount that reduces the gating angle α by g degrees, as shown by the dot-dash line C. This would produce the same change in α on each half cycle of source voltage and would correspondingly increase the conduction angle σ during each conduction period. Accordingly, in the resistive power circuit, symmetrical current conditions would be maintained despite the change in gating angle.

Referring next to the inductive power circuit application of FIG. 2a, assume that the input signal is increased between instants E and F by an amount to reduce the gating angle α by g degrees, as shown by the dot-dash lines C. This would result in the conduction angle increasing by an amount 2g, and a corresponding delay in the reappearance of voltage at F′ by an amount g. The nonconduction period following F′ would be the same as on the previous half cycle, and conduction would thus be initiated again at H and would continue through the same conduction angle as before the change in input signal. The next conduction period would begin at a time corresponding to C and continue until F′. Thus it will be apparent that the change in input signal has resulted in an asymmetrical current condition, with the forward conduction periods (between C and F′) longer than the reverse conduction periods. If the input signal is further increased at an instant between E and C, the forward conduction period between C and F′ would be further increased without increasing the reverse conduction period, thus making the asymmetry even more pronounced.

This asymmetrical current condition is an undesirable one because it results in a d-c current component flowing through the power circuit, and such current component can produce objectionable saturation and overheating effects. One factor responsible for the development of this asymmetrical condition is that we have, in the above-described example, changed all our nonconducting periods by a fixed amount for a given change in input signal, and, in the purely inductive circuit, this has increased one conduction angle without changing the other.

We overcome this problem by providing a conduction-angle balancing circuit 80 which functions in a manner soon to be described to quickly restore the conduction angles to their original condition of equality despite the change in input signal. A description of this balancing circuit 80 follows.

Conduction Angle Balancing

For forcing the conduction angles of the two thyristors 17a and 17b to be the same for a given input control signal at 22, we provide a conduction-angle balancing circuit at 80 (FIG. 1). This conduction angle balancing circuit 80 develops a unidirectional balance-indicating signal that has a magnitude proportional to the difference between the conduction angles of the two thyristors. The balance-indicating signal is negative if forward thyristor 17a has the longer conduction angle and positive if the reverse thyristor 17b has the longer conduction angle. This balance-indicating signal is fed to summing circuit 40 via a channel 82 and is added to the input signals received via the other channels 22, 42, and 36 during the timing period preceding the firing of forward thyristor 17a. If the balance-indicating signal is positive, indicating that forward thyristor 17a has a shorter conduction angle than 17b, the balance indicating signal acts to advance the triggering of thyristor 17a thereby lengthening its conduction angle and causing a resultant shortening of the conduction angle of the other thyristor 17b, thus forcing these conduction angles toward equality, all in a manner soon to be described in detail. Conversely, if the balance indicating signal is negative, it acts to retard triggering of thyristor 17a, thereby shortening its conduction angle and lengthening the conduction angle of the other thyristor 17b to force these conduction angles toward equality.

Referring now more specifically to the conduction-angle balancing circuit 80, this circuit comprises two pulse generators 84 and 85. Whenever thyristor 17a begins conducting, pulse generator 84 produces a constant amplitude pulse of negative polarity (shown at 86 in FIG. 4e) having a duration equal to the duration of the conducting interval of thyristor 17a. When the other thyristor 17b conducts, the other pulse generator 85 produces a constant amplitude pulse of positive polarity (shown at 87 in FIG. 4e) having a duration equal to the duration of the conduction interval of 17b. Suitable sensing means including voltage sensor 24 is provided for turning on the proper pulse generator 84 or 85 depending upon which thyristor 17a or 17b is conducting.

The pulse developed by each pulse generator is fed to a frequency attenuator 89, in the form of an integrator, that integrates the pulse input to provide a voltage that linearly increases in the direction of the pulse input polarity. The negatively increasing voltage resulting from negative pulse 86 is shown at 90 in FIG. 4f, and the positively increasing voltage resulting from a positive pulse 87 is shown at 91 in FIG. 4f. As shown at 94 in FIG. 4f, the peak voltage to which the negative signal 90 increases is held until the positively increasing signal 91 is received, following which the positively increasing signal is added to this peak value to provide (at the instant 93 that forward voltage begins on thyristor 17a) a balance-indicating signal 92 equal to the difference between the peak value of the two voltages 90 and 91. This balance-indicating signal 92 has a magnitude that is proportional to the difference in time duration between the two pulses 86 and 87, which in turn equals the difference in the conduction angles of the two thyristors 17a and 17b.

The balance-indicating signal 92 is applied to summing circuit 40, but only from the instant 93 when the summing circuit is operating during the period that forward voltage is on forward thyristor 17a preceding its firing. In this respect, a gate 95 normally blocks this balance-indicating signal from reaching summing circuit 40, but this gate is rendered nonblocking when forward voltage begins building up across forward thyristor 17a, thus allowing the balance-indicating signal then to be supplied to the summing circuit for the entire period when forward voltage is present on nonconducting forward thyristor 17a prior to its firing. A suitable permissive circuit 96 renders gate 95 nonblocking during this interval. In the disclosed embodiment, the balance-indicating signal is not permitted to reach the summing circuit 40 during the summing period before the firing of the other thyristor 17b.

As previously pointed out, if the balance-indicating signal 92 is positive, it advances the firing point of thyristor 17a, thus lengthening the conduction angle of this thyristor 17a. This phase-angle advancement takes place because when the balance-indicating signal 92 is received at instant 93 in FIG. 4g, the base line 52 shifts to a less negative position, thus reducing the time required by the increasing signal 50 received via channel 36 to cross the 0 line.

In an inductive circuit having a power factor appreciably different from 1, advancing the gating angle of thyristor 17a results in retarding the gating angle of the other thyristor 17b. This is the case because advancing the gating angle of thyristor 17a by an amount X as shown at 100 in FIG. 4e results in prolonging the conduction period after voltage 0 as shown at 102. It will be assumed that the circuit is purely inductive, in which case the prolongation at 102 will be equal to X, thus lengthening the total conduction time of thyristor 17a by 2X degrees. As a result of the change at 102, the reverse thyristor 17b is fired X° later than on the previous cycle of voltage; and this reduces the conduction time of thyristor 17b after voltage 0 by X°, thus shortening its total conduction time by 2X°. Thus, the conduction times of the two thyristors 17a and 17b are changed in opposite directions, thereby driving them toward equality. If the changes in the two conduction angles are insufficient to equalize the two conduction angles, then a balance-indicating signal is again developed on the next cycle at instant 103, and the conduction angles are again changed in directions to produce equality.

If the balance-indicating signal 92 is negative instead of positive as above described, it will retard the firing point of thyristor 17a, thus shortening the conduction angle of thyristor 17a and lengthening the conduction angle of thyristor 17b, to drive these conduction angles toward equality in generally the same manner as above described.

If the circuit is not purely inductive, then the increment at 102 will be less than that at 100. This will result in less shortening of the conduction angle of thyristor 17b and a larger balance-indicating signal will accordingly be present at instant 103 than with the purely inductive circuit. This simply results in one or more additional balancing operations on the next few cycles.

From the above description, it will be apparent that with the conduction-angle balancing circuit 80 present, a change in the input signal at 22 produces the correct change in the conduction angle without causing an asymmetrical current condition to develop even though the power circuit might have a very low power factor. Furthermore, at any steady state magnitude of the input signal, including 0 (fully-off condition of the switch), the circuit 80 will properly control the gating angles of the thyristors 17a and 17b to correct any conduction-angle unbalance that actually develops for any reason.

In a preferred form of the invention, the conduction-angle balancing frequency attenuator 89 is reset to a 0 output condition each time the thyristor 17a is fired. This resetting is effected by reset means 104, which is turned-on each time the pulse amplifier 62 receives a pulse from pulse generator 58.

It is to be noted that control power for the various components of the gating control is derived from a control power supply that is independent of the power circuit 10 and independent of voltage across switch 16. Leads from this control power supply to the function generator 27 are shown at 105. Similar leads extend to all the other components of the gate control requiring control power but, for simplicity, are not shown. Having an independent control power supply is advantageous in isolating the gating control from the effects of variations in power circuit voltage and current and in making the control power independent of voltage across the switch 16.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A gating control for an a-c phase-controlled static switch comprising a pair of thyristors connected in inverse parallel relationship in a power circuit that is operable with a power factor substantially different from unity, said gating control comprising:

a. means for developing an off-time indicating signal that varies in magnitude as a direct function of the time interval that said thyristors both remain in their nonconducting state preceding the gating of one of said thyristors,
  b. means for supplying an effective input control signal to said gating control that has a magnitude indicative of the conduction angles desired for said thyristors,
  c. means for comparing the conduction angles of said inverse parallel thyristors on successive conducting periods and for deriving a balance-indicating signal having a magnitude indicative of the difference between said conduction angles,
  d. summing means effective while said thyristors are in their nonconducting state preceding the firing of said one thyristor for adding said effective input control signal, said off-time indicating signal, and said balance-indicating signal together to provide a gating control signal that has a magnitude dependent upon the sum of said signals, and e. means for developing a gating pulse for delivery to said one thyristor when said gating control signal reaches a predetermined level, whereby said one thyristor is gated into conduction at an instant dependent on the magnitudes of said effective input control signal and said balance-indicating signal.

2. A gating control as defined in claim 1 in which:
a. said effective input control signal for desired conduction angles less than 180° has a polarity opposite to that of said off-time indicating signal, and
b. said balance-indicating signal has a polarity the same as said off-time indicating signal when the conduction angle of said one thyristor is longer than the conduction angle of the other of said thyristors.

3. A gating control as defined in claim 1 in which: on the next nonconducting period following firing of said one thyristor, a gating pulse is developed for delivery to said other thyristor at a time following the start of said next nonconducting period that:
a. is dependent upon the sum of said effective input control signal and an off-time indicating signal representative of the duration of said next nonconducting period and
b. is independent of any balance-indicating signal.

4. A gating control as defined in claim 1 in which the gating of said other thyristor is effected at a time following the start of the nonconducting period preceding said latter gating that is dependent on said effective input control signal but is independent of the difference in said conduction angles.

5. A gating control for an a-c phase-controlled, single-phase static switch comprising a pair of thyristors connected in inverse parallel relationship in a power circuit that has a variable power factor, said gating control comprising:
a. off-time indicating means for developing an off-time indicating signal that varies in magnitude as a direct function of the time interval that said thyristors both remain in their nonconducting state preceding the gating of either of said thyristors,
b. means for supplying an effective input control signal to said gating control that has a magnitude indicative of the conduction angles desired for said thyristors,
c. summing means effective while said thyristors are in their nonconducting state preceding the gating of a thyristor for adding said effective input control signal and said off-time indicating signal together to provide a gating control signal that has a magnitude dependent upon the sum of said signals,
d. means for developing a gating pulse for delivery to one of said thyristors when said gating control signal reaches a predetermined level,
e. resetting means for returning said off-time indicating signal to zero when the forward voltage across said one thyristor disappears, irrespective of whether or not gating of said one thyristor has occurred during the period that forward voltage has appeared across said one thyristor,
f. and means for developing during the next forward voltage period across the other of said thyristors another gating pulse for delivery to said other thyristor when said gating control signal reaches a predetermined level.

6. The gating control of claim 5 in which:
a. control-power supply means is provided for supplying control power to said off-time indicating means independently of said power circuit, and
b. means is provided for electrically insulating from said power circuit said input control signal-supplying means of (b), claim 5.

7. The gating control of claim 5 in which:
a. said means for developing said gating pulses comprises a level detector that receives said gating control signal and is operable in response to said gating control signal reaching said predetermined level,
b. and permissive means is provided for preventing said level detector from effectively receiving said gating control signal so long as said switch is in a conducting state, whereby said level detector is prepared to properly respond on the next nonconducting period of said switch to a change in the gating control signal effectively received by said level detector.

8. The gating control of claim 5 in which:
a. said means for developing said gating pulses comprises a crossing detector that receives said gating control signal and detects when said gating control signal passes through a threshold level slightly on one side of ., 0,
b. said effective input control signal has a magnitude on the 0 side of said threshold level when said effective input control signal is calling for conduction angles less than 180°,
c. and said gating control signal which results from the addition of said effective input control signal and said off-time indicating signal crosses said threshold level when said addition occurs if said effective input control signal is calling for conduction angles greater than 0°.

9. A gating control for an a-c phase-controlled single phase static switch comprising a pair of thyristors connected in inverse parallel relationship in a power circuit that has a variable power factor, said gating control comprising:
a. means responsive to the voltage appearing across said switch for developing a first indicating signal of substantially constant magnitude whenever said two thyristors enter their nonconducting state, said first indicating signal beginning within a few electrical degrees after said thyristors enter their nonconducting state, even when voltage thereacross rises at the same rate as the source voltage in building up from a natural voltage 0,
b. a frequency attenuator to which said first indicating signal is supplied for producing an off-time indicating signal that progressively increases in magnitude while said first indicating signal is received by said attenuator,
c. summing means to which are supplied said off-time indicating signal, a constant magnitude biasing signal of a polarity opposite to that of said off-time indicating signal, and an input control signal of the same polarity as said off-time indicating signal; said summing means having an output which is representative of the sum of said biasing signal, said off-time indicating signal, and said input control signal,
d. means responsive to the output of said summing means for supplying a gating pulse to the gate of one of said thyristors when said summing means output reaches a predetermined threshold level,
e. said summing means output reaching said predetermined threshold level in a time commencing with entry of said thyristors into their nonconducting state that remains substantially constant for a given magnitude input control signal despite changes in the power factor of said power circuit.

10. The gating control of claim 9 in which:
a. said means responsive to the output of said summing means comprises a level detector that is adapted to receive said output, and
b. permissive means is provided for preventing said level detector from effectively receiving said output so long as said switch is in a conducting state, whereby said level detector is prepared to properly respond on the next nonconducting period of said switch to a change in said output.

11. The gating control of claim 9 in combination with:
a. means for comparing the conduction angles of said thyristors on successive conducting periods and for deriving a balance-indicating signal having a magnitude indicative of the difference in said conduction angles, and
b. means for controlling the time required for said summing means output to reach said threshold level as a function of said balance-indicating signal.

12. A gating control for an a-c phase-controlled static switch comprising a pair of thyristors connected in inverse parallel relationship in a power circuit that is operable with a power factor substantially different from unity, said gating control comprising:
   a. means for developing an off-time indicating signal that varies in magnitude as a direct function of the time interval that said thyristors both remain in their non-conducting state preceding the gating of one of said thyristors,
   b. means for supplying an effective input control signal to said gating control that has a magnitude indicative of the conduction angles desired for said thyristors,
   c. means for sensing any d-c component of current in said power circuit resulting from current asymmetry and for deriving a balance-indicating signal having a magnitude indicative of the magnitude of said d-c component,
   d. summing means effective while said thyristors are in their non-conducting state preceding the firing of said one thyristor for adding said effective input control signal, and said balance-indicating signal together to provide a gating control signal that has a magnitude dependent upon the sum of said signals, and
   e. means for developing a gating pulse for delivery to said one thyristor when said gating control signal reaches a predetermined level, whereby said one thyristor is gated into conduction at an instant dependent on the magnitudes of said effective input control signal and said balance-indicating signal.

13. A gating control as defined in claim 12 in which the gating of said other thyristor is effected at a time following the start of the non-conducting period preceding said latter gating that is dependent on said effective input control signal but is independent of any balance-indicating signal.

14. A gating control for an a-c static switch comprising a pair of thyristors connected in inverse parallel relationship in a power circuit that is operable with a power factor substantially different from unity, said gating control comprising:
   a. means for developing gating pulses for delivery to alternate thyristors at predetermined gating angles during successive half cycles of voltage appearing across said switch, thus causing said alternate thyristors successively to conduct for predetermined conduction angles,
   b. balancing means for measuring and comparing the conduction angles of said alternate thyristors on successive conducting periods and for deriving a balance-indicating signal having a magnitude indicative of the difference between said conduction angles,
   c. said balancing means comprising: (c') means for developing first and second signals of opposite polarities each having a magnitude substantially proportional to the conduction-angle of the conducting one of said thyristors on successive conduction periods, and (c'') means for adding together said opposite polarity signals to derive a signal equal to the difference between said opposite polarity signals which serves as said balance-indicating signal,
   d. and means sensitive to said balance-indicating signal for varying the gating angles at which said gating pulses are delivered as a function of the magnitude of said balance-indicating signal.

* * * * *

PO-1050
(5/69)

UNITED STATES PATENT OFFICE
CERTIFICATE OF CORRECTION

Patent No. 3,665,293      Dated May 23, 1972

Inventor(s) Yoel Keiles, Fred W. Kelley, Jr. & Georges R. E. Lezan

It is certified that error appears in the above-identified patent and that said Letters Patent are hereby corrected as shown below:

Front page -

Change the spelling of co-inventor's name from -

"Yoel Keiler" to - Yoel Keiles -

Signed and sealed this 24th day of October 1972.

(SEAL)
Attest:

EDWARD M. FLETCHER, JR.
Attesting Officer

ROBERT GOTTSCHALK
Commissioner of Patents